(12) United States Patent
Porob et al.

(10) Patent No.: US 10,815,423 B2
(45) Date of Patent: Oct. 27, 2020

(54) RED-EMITTING PHOSPHORS, PROCESSES AND DEVICES

(71) Applicant: Current Lighting Solutions, LLC, East Cleveland, OH (US)

(72) Inventors: Digamber Gurudas Porob, Bangalore (IN); Anant Achyut Setler, Niskayuna, NY (US); Prasanth Kumar Nammalwar, Karnataka (IN); James Edward Murphy, Niskayuna, NY (US)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 333 days.

(21) Appl. No.: 15/555,719

(22) PCT Filed: Mar. 2, 2016

(86) PCT No.: PCT/US2016/020438
§ 371 (c)(1),
(2) Date: Sep. 5, 2017

(87) PCT Pub. No.: WO2016/141049
PCT Pub. Date: Sep. 9, 2016

(65) Prior Publication Data
US 2018/0051207 A1 Feb. 22, 2018

(30) Foreign Application Priority Data
Mar. 5, 2015 (IN) .......................... 1093/CHE/2015

(51) Int. Cl.
| | | |
|---|---|---|
| *C09K 11/57* | (2006.01) | |
| *C09K 11/61* | (2006.01) | |
| *C01G 23/00* | (2006.01) | |
| *C01B 33/10* | (2006.01) | |
| *C25B 15/08* | (2006.01) | |
| *C25B 1/00* | (2006.01) | |
| *C01G 25/00* | (2006.01) | |
| *C01G 29/00* | (2006.01) | |
| *C01G 35/00* | (2006.01) | |
| *C01G 33/00* | (2006.01) | |
| *C01G 19/00* | (2006.01) | |
| *C01G 17/00* | (2006.01) | |
| *C01G 45/00* | (2006.01) | |
| *C25B 1/14* | (2006.01) | |

(52) U.S. Cl.
CPC ............. *C09K 11/57* (2013.01); *C01B 33/10* (2013.01); *C01G 17/006* (2013.01); *C01G 19/006* (2013.01); *C01G 23/002* (2013.01); *C01G 25/006* (2013.01); *C01G 29/006* (2013.01); *C01G 33/006* (2013.01); *C01G 35/006* (2013.01); *C01G 45/006* (2013.01); *C09K 11/616* (2013.01); *C09K 11/617* (2013.01); *C25B 1/00* (2013.01); *C25B 1/14* (2013.01); *C25B 15/08* (2013.01); *C01P 2002/50* (2013.01); *C01P 2002/54* (2013.01); *C01P 2004/61* (2013.01); *C09K 2211/182* (2013.01); *C09K 2211/183* (2013.01); *C09K 2211/188* (2013.01)

(58) Field of Classification Search
CPC ..... C09K 11/57; C09K 11/616; C09K 11/617; C01B 33/10; C25B 1/245
See application file for complete search history.

(56) References Cited

U.S. PATENT DOCUMENTS

| | | |
|---|---|---|
| 7,358,542 B2 | 4/2008 | Radkov et al. |
| 7,497,973 B2 | 3/2009 | Radkov et al. |
| 7,648,649 B2 | 1/2010 | Radkov et al. |
| 8,252,613 B1 | 8/2012 | Lyons et al. |
| 8,491,816 B2 | 7/2013 | Hong et al. |
| 2010/0142189 A1 | 6/2010 | Hong et al. |
| 2012/0256125 A1 | 10/2012 | Kaneyoshi et al. |
| 2014/0264418 A1 | 9/2014 | Murphy et al. |

FOREIGN PATENT DOCUMENTS

| | | |
|---|---|---|
| CN | 101037234 A | 9/2007 |
| CN | 101646747 A | 2/2010 |
| CN | 103429701 A | 12/2013 |
| CN | 103429702 A | 12/2013 |
| CN | 104114671 A | 10/2014 |

(Continued)

OTHER PUBLICATIONS

Translation of WO 2015/115194, Aug. 6, 2015.*
Kasa et al., "Red and Deep Red Emissions from Cubic K2SiF6:Mn4+ and Hexagonal K2MnF6 Synthesized in HF/KMnO4/KHF2/Si Solutions", Journal of Electrochemical Society, vol. 159, issue 4, J89-J95, 2012.
Liao et al., "Synthesis of K2SiF6:Mn4+ Phosphor from SiO2 Powders via Redox Reaction in HF/KMnO4 Solution and Their Application in Warm-White LED", Journal of the American Ceramic Society, vol. 96, Issue 11, pp. 3552-3556, Nov. 2013.
Takahashi et al., "Mn4+-Activated Red Photoluminescence in K2SiF6 Phosphor", Journal of Electrochemical Society, vol. 155, issue 12, E183-E188, 2008 .

(Continued)

*Primary Examiner* — C Melissa Koslow
(74) *Attorney, Agent, or Firm* — Buckley, Maschoff & Talwalkar LLC

(57) ABSTRACT

A process for synthesizing a $Mn^{4+}$ doped phosphor of formula I by electrolysis is presented. The process includes electrolyzing a reaction solution comprising a source of manganese, a source of M and a source of A. One aspect relates to a phosphor composition produced by the process. A lighting apparatus including the phosphor composition is also provided. $A_x[MF_y]:Mn^{4+}$ (I) where, A is Li, Na, K, Rb, Cs, or a combination thereof; M is Si, Ge, Sn, Ti, Zr, Al, Ga, In, Sc, Hf, Y, La, Nb, Ta, Bi, Gd, or a combination thereof; x is the absolute value of the charge of the $[MF_y]$ ion; and y is 5, 6 or 7.

9 Claims, 4 Drawing Sheets

(56) References Cited

FOREIGN PATENT DOCUMENTS

| DE | 544118 C | 2/1932 |
|---|---|---|
| EP | 2508586 A2 | 10/2012 |
| WO | 92/13364 A1 | 8/1992 |
| WO | 2007/100824 A2 | 9/2007 |
| WO | WO 2015/115194 * | 8/2015 |

OTHER PUBLICATIONS

"Chinese Office Action and Search Report", dated Nov. 20, 2019, National Intellectual Property Administration, P.R. China, for Chinese Application No. 201680013986.3, 3pgs.

"PCT International Search Report", dated Jun. 23, 2016, for International Application No. PCT/US2016/020438, 2pgs.

"PCT International Preliminary Report and Written Opinion", dated Sep. 5, 2017 (Sep. 5, 2017), for International Application No. PCT/US2016/020438, 7pgs.

* cited by examiner

RED-EMITTING PHOSPHORS, PROCESSES AND DEVICES

TECHNICAL FIELD

The invention relates generally to red-emitting phosphors. More particularly, the invention relates to a process for synthesizing a $Mn^{4+}$ doped phosphor.

BACKGROUND

Red-emitting phosphors based on complex fluoride materials activated by $Mn^{4+}$, such as those described in U.S. Pat. Nos. 7,358,542, 7,497,973, and 7,648,649, can be utilized in combination with yellow/green emitting phosphors such as YAG:Ce or other garnet compositions to achieve warm white light (CCTs<5000 K on the blackbody locus, color rendering index (CRI)>80) from a blue LED, equivalent to that produced by current fluorescent, incandescent and halogen lamps. These materials absorb blue light strongly and efficiently emit between about 610-635 nm with little deep red/NIR emission. Therefore, luminous efficacy is maximized compared to the red phosphors that have significant emission in the deeper red where eye sensitivity is poor. Quantum efficiency can exceed 85% under blue (440-460 nm) excitation.

Various processes for synthesizing the $Mn^{4+}$ doped complex fluoride phosphors are known, for example as described in US20120256125, WO2007/100824, US 20100142189 and EP2508586. Typically, for the synthesis of these $Mn^{4+}$ doped complex fluorides, a compound having manganese in tetravalent state ($Mn^{4+}$), for example $K_2MnF_6$, is used as stating material. However, this starting material is generally not stable in an environment, and is thus usually prepared for use just before the synthesis of the phosphor.

Alternative processes that can provide advantages over existing processes, such as improved phosphor properties or lower cost for manufacturing, are desirable.

BRIEF DESCRIPTION

In one aspect, the present invention relates to a process for synthesizing a $Mn^{4+}$ doped phosphor of formula I ($A_x[MF_y]$:$Mn^{4+}$) by electrolysis. The process includes electrolyzing a reaction solution including a source of manganese, a source of M and a source of A, where A is Li, Na, K, Rb, Cs, or a combination thereof; and M is Si, Ge, Sn, Ti, Zr, Al, Ga, In, Sc, Hf, Y, La, Nb, Ta, Bi, Gd, or a combination thereof; and x is the absolute value of the charge of the $[MF_y]$ ion; and y is 5, 6 or 7. One aspect relates to the $Mn^{4+}$ doped phosphor of formula (I) that may be produced by the process.

In another aspect, the present invention relates to a lighting apparatus and a backlight device, which include the $Mn^{4+}$ doped phosphor of formula (I).

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
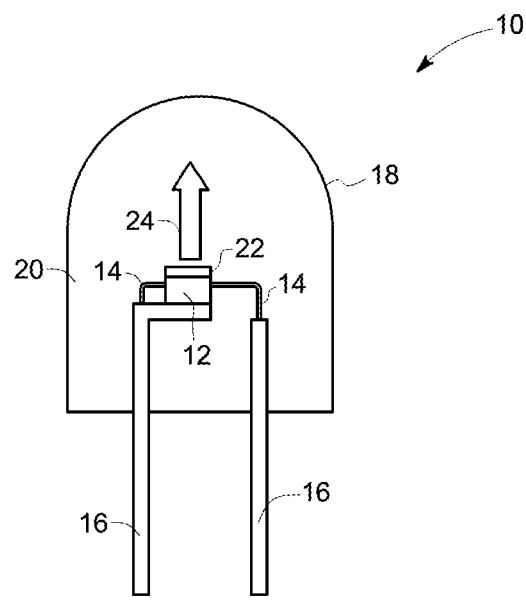
FIG. 1 is a schematic cross-sectional view of a lighting apparatus, in accordance with one embodiment of the invention.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value. In the following specification and claims, the singular forms "a", "an" and "the" include plural referents, unless the context clearly dictates otherwise.

As used herein, the term "phosphor", "phosphor composition" or "phosphor material" may be used to denote both a single phosphor composition as well as a blend of multiple phosphor compositions.

In the context of the present invention, the term "complex fluoride" or "complex fluoride material" means a coordination compound, containing at least one coordination center, surrounded by fluoride ions acting as ligands, and charge-compensated by counter ions as necessary. For example, in $K_2[SiF_6]$, the coordination center is Si and the counter ion is K. Complex fluorides are occasionally written down as a combination of simple, binary fluorides but such a representation does not indicate the coordination number for the ligands around the coordination center. The square brackets (occasionally omitted for simplicity) indicate that the complex ion they encompass is a new chemical species, different from the simple fluoride ion.

In the $Mn^{4+}$ doped phosphors, for example $Mn^{4+}$ doped complex fluoride materials such as $K_2SiF_6$:$Mn^{4+}$, the activator ion ($Mn^{4+}$) also acts as a coordination center, substituting part of the centers of the host lattice, for example, Si. The host lattice (including the counter ions) may further modify the excitation and emission properties of the activator ion. The coordination center of the complex fluoride composition is manganese (Mn). The host lattice i.e., M in formula (I), is an element selected one or more from Si, Ge, Ti, Zr, Hf, Sn, Al, Ga, In, Sc, Y, Bi, La, Gd, Nb, Ta. In some particular instances, M is a tetravalent element selected from Si, Ge, Ti, and a combination thereof. The counter ion i.e., A in formula I is an alkali metal selected from Li, Na, K, Rb, Cs, and a combination thereof, x is 2 and y is 6.

Examples of $Mn^{4+}$-doped phosphors of formula I include $K_2[SiF_6]$:$Mn^{4+}$, $K_2[TiF_6]$:$Mn^{4+}$, $K_2[SnF_6]$:$Mn^{4+}$, $Cs_2[TiF_6]$:$Mn^{4+}$, $Rb_2[TiF_6]$:$Mn^{4+}$, $Cs_2[SiF_6]$:$Mn^{4+}$, $Rb_2[SiF_6]$:$Mn^{4+}$, $Na_2[TiF_6]$:$Mn^{4+}$, $Na_2[ZrF_6]$:$Mn^{4+}$, $K_3[ZrF_7]$:$Mn^{4+}$, $K_3[BiF_6]$:$Mn^{4+}$, $K_3[YF_6]$:$Mn^{4+}$, $K_3[LaF_6]$:$Mn^{4+}$, $K_3[GdF_6]$:$Mn^{4+}$, $K_3[NbF_7]$:$Mn^{4+}$, $K_3[TaF_7]$:$Mn^{4+}$. In particular embodiments, the phosphor of formula I is $K_2SiF_6$:$Mn^{4+}$.

According to embodiments of the invention, a $Mn^{4+}$ doped phosphor of formula I may be prepared by electrolysis. The process includes electrolyzing a reaction solution that includes a source of manganese, a source of M and a source of A. In one embodiment, the solution is prepared by mixing the constituents i.e., the source of manganese, the source of M and the source of A in aqueous hydrofluoric acid. The electrolysis is carried out in an electrolytic cell by passing an electric current through the reaction solution.

A suitable source of manganese is a compound that directly provides a tetravalent manganese ($Mn^{4+}$) or can be converted to another compound to provide a tetravalent manganese ($Mn^{4+}$) in a solution with aqueous hydrofluoric acid. In some embodiments, the source of manganese is a compound that provides manganese in a divalent state ($Mn^{2+}$), a trivalent state ($Mn^{3+}$), a tetravalent state ($Mn^{4+}$), a pentavalent state ($Mn^{5+}$), a hexavalent state ($Mn^{6+}$) or combinations thereof. In some instances, the compound has manganese in mixed valance state. Examples of suitable sources of manganese include manganese (II) fluoride ($MnF_2$), manganese (III) fluoride ($MnF_3$), manganese (III) chloride ($MnCl_3$), manganese (II) chloride ($MnCl_2$) hydrate, manganese oxide ($MnO_2$) and a combination thereof. In particular embodiments, the source of manganese is $MnO_2$, $MnF_2$ or $MnF_3$. Other examples are manganese acetate, manganese carbonate and manganese nitrate.

The present invention provides the opportunity to use a compound that has manganese in an oxidation state other than a tetravalent state. A compound providing manganese in a divalent state, a trivalent state, a pentavalent state, a hexavalent state or mixed valence state can be used as the starting material for the preparation of the phosphor of formula I. Examples of such compounds are described above. Most of these compounds are readily available and easy to handle because these are inert under ambient conditions. In some embodiments, manganese is in elemental form, that is, manganese metal can be used. In some embodiments, the starting material may be a compound that provides manganese in tetravalent state.

The source of A may be a salt, wherein the corresponding anion for $A^+$ is fluoride, chloride, acetate, chloride, oxalate, dihydrogen phosphate, or a combination thereof. Particularly, the anion is fluoride. The source of A may be, for example, $AOCH_3$. Examples of suitable materials include KF, $KHF_2$, LiF, $LiHF_2$, NaF, $NaHF_2$, RbF, $RbHF_2$, CsF, $CsHF_2$, and combinations thereof. In particular embodiments, the anion is fluoride, and A includes K.

The source of M may be a compound that is soluble in hydrofluoric acid. As described previously, in some embodiments, the element M is Si, Ge, Ti or a combination thereof. In particular embodiments, M is Si. Examples of suitable sources of Si include $H_2SiF_6$, $A_2SiF_6$, $SiO_2$, $SiCl_4$, $Si(OAc)_4$, wherein OAc is acetate, tetraethyl orthosilicate $(Si(OEt)_4)$ and combinations thereof. Particular example of Si source is $H_2SiF_6$. Examples of suitable sources of Ge include $GeCl_4$, $Ge(OEt)_4$, $Ge(OPr)_4$, wherein OPr is a propoxy group (i.e., a radical of propanol, where the "H" of propanol is removed), $Ge(OMe)_4$, wherein OMe is a methoxy group, $GeO_2$ and combinations thereof.

In some embodiments, the source of M and the source of A are simultaneously added with the source of manganese to the aqueous hydrofluoric acid to form the reaction solution. The reaction solution is subsequently electrolyzed as described herein.

As mentioned previously, the electrolysis is carried out in an electrolytic cell having a positive electrode and a negative electrode. Any suitable electrically conductive material that is chemically stable in hydrofluoric acid can be used for electrodes. Some suitable metals for the electrodes are platinum (Pt), rhodium (Rh), gold (Au), or a combination thereof. In one embodiment, platinum electrodes are used. Some other embodiments include Pt-10% Rh. An example of a non-metal electrode is graphite. In one embodiment, a power supply is connected to the electrodes for passing a current of about 0.75 ampere at a voltage of about 3 volts to carry out electrolysis. The reaction solution may be continuously stirred during the electrolysis. After the completion of electrolysis, a suspension is achieved, which is filtered and then washed followed by drying to obtain the product in powder form.

However, the rates of addition of constituents, their addition times and addition orders, temperatures and reactant concentrations are not critical, and may be tuned to optimize the performance of the resulting $Mn^{4+}$ doped phosphor for a particular application.

In some embodiments, a solution is first formed by dissolving the source of manganese in aqueous hydrofluoric acid. This manganese solution is first electrolyzed for a duration of time by passing an electric current through the solution to form an electrolyzed manganese solution. In some instances, the electrolysis of the manganese solution is carried out until manganese is obtained in trivalent state ($Mn^{3+}$ ions) that is generally identified by observing a red-brown solution. Then, suitable amounts of the source of M and the source of A are combined with the electrolyzed manganese solution to form a combined solution. This combined solution is further electrolyzed by passing an electric current through the solution, as described previously.

Concentration of the hydrofluoric acid in the aqueous solutions used in the process of the present invention typically ranges from about 20% w/w to about 70% w/w, particularly from about 40% w/w to about 55% w/w. Other acids may be included in the solution if desired, such as hexafluorosilicic acid ($H_2SiF_6$).

Some embodiments of the invention thus provide a phosphor composition derived from electrolyzing a reaction solution containing a source of manganese, a source of tetravalent element M and a source of an alkali metal A, where A is selected from Li, Na, K, Rb, Cs and combinations thereof; and M is selected from Si, Ge, Ti and combinations thereof. The details of the process are described above.

The process of the present invention allows control of the particle size of the resulting phosphor particles. By optimizing process details such as the amount of hydrofluoric acid, the amounts of the sources of the constituents, and the duration of electrolysis, the particle size of the resulting phosphor particles can be tailored.

In some embodiments, the phosphor composition has a particle size distribution with a D50 particle size less than about 50 microns. In some embodiments, the D50 particle size ranges from about 20 microns to about 30 microns. In some embodiments, the population of phosphor particles has a D90 particle size in a range from about 30 microns to about 70 microns.

As used herein, D values such as D90, D50 and D10 are generally used to represent particle size distribution. D90, D50 or D10 is defined as a size value corresponding to cumulative size distribution, respectively, at 90%, 50%, or 10%, which indicates that 90%, 50%, or 10% of particles of a sample are below the D90, D50, or D10 value.

In some embodiments, the phosphor composition has a fine particle size distribution with a D50 value of less than about 10 microns. In particular embodiments, the D50 particle size ranges from about 5 microns to about 15 microns. In some embodiments, the D90 particle size ranges from about 10 microns to about 20 microns. In some embodiments, a D10 particle size is in a range from about 1 micron to about 10 microns. In particular embodiments, the particle size D10/D50/D90 is 2/6/10 microns.

The fine particle size distribution of the phosphor may be advantageous for desired properties. For example, the sedimentation rate (or settling rate) of the phosphor particles in an encapsulant material (for example, silicone) decreases with the particle size of the phosphor particles. By controlling the particle size and particle size distribution, the sedimentation rate of the particles can be tuned to match, be slower or be faster than other phosphors in a blend, and thus enables control over the separation of phosphors. The separation of phosphors can be beneficial to protect the $Mn^{4+}$ doped phosphors from damage caused by the excitation flux. In addition, the amount and the location (closer or farther from an LED chip) of the phosphor particles can be controlled in order to achieve a desired color point. Moreover, the fine particle size (as discussed above) may allow the use of simple deposition techniques, for example spray coating techniques.

In one embodiment, the synthesized $Mn^{4+}$ doped phosphor is contacted with a metal scavenger. The metal scavenger removes a contamination of a metal, which may occur during the synthesis process from the electrodes. An example of the metal scavenger for removing a platinum contamination is Smopex®.

After completion of the described synthesis process steps, the Me doped phosphor may undergo a treatment process as described in U.S. Pat. No. 8,252,613. In one embodiment, the synthesized $Mn^{4+}$ doped phosphor is contacted with a fluorine-containing oxidizing agent in gaseous form at an elevated temperature. The temperature at which the phosphor is contacted with the fluorine-containing oxidizing agent may range from about 200° C. to about 900° C., particularly from about 350° C. to about 600° C., and in some embodiments, from about 400° C. to about 575° C. In various embodiments of the present invention, the temperature is at least 100° C., particularly at least 225° C., and more particularly at least 350° C. The phosphor is contacted with the oxidizing agent for a period of time sufficient to increase its performance and stability of the resulting phosphor. Time and temperature are interrelated, and may be adjusted together, for example, increasing time while reducing temperature, or increasing temperature while reducing time. In particular embodiments, the time is at least one hour, particularly for at least four hours, more particularly at least six hours, and most particularly at least eight hours.

Reducing the temperature at a controlled rate of less than or equal to 5° C. per minute may yield a phosphor product having superior properties compared to reducing the temperature at a rate of 10° C. per minute. In various embodiments, the rate may be controlled at less than or equal to 5° C. per minute, particularly at less than or equal to 3° C. per minute, more particularly at a rate of less than or equal to 1° C. per minute.

The period of time over which the temperature is reduced at the controlled rate is related to the contact temperature and cooling rate. For example, when the contact temperature is 540° C. and the cooling rate is 10° C. per minute, the time period for controlling the cooling rate may be less than one hour, after which the temperature may be allowed to fall to the purge or ambient temperature without external control. When the contact temperature is 540° C. and the cooling rate is less than equal to 5° C. per minute, then the cooling time may be less than two hours. When the contact temperature is 540° C. and the cooling rate is ≤3° C. per minute, then the cooling time may be less than three hours. When the contact temperature is 540° C. and the cooling rate is ≤1° C. per minute, then the cooling time is may be less than four hours. For example, the temperature may be reduced to about 200° C. with controlled cooling, and then control may be discontinued. After the controlled cooling period, the temperature may fall at a higher or lower rate than the initial controlled rate.

The fluorine-containing oxidizing agent may be $F_2$, HF, $SF_6$, $BrF_5$, $NH_4HF_2$, $NH_4F$, KF, $AlF_3$, $SbF_5$, $ClF_3$, $BrF_3$, KrF, $XeF_2$, $XeF_4$, $NF_3$, $SiF_4$, $PbF_2$, $ZnF_2$, $SnF_2$, $CdF_2$ or a combination thereof. In particular embodiments, the fluorine-containing oxidizing agent is $F_2$. The amount of oxidizing agent in the oxidizing atmosphere may be varied to obtain the desirable properties of the phosphor, particularly in conjunction with variation of time and temperature. Where the fluorine-containing oxidizing agent is $F_2$, the atmosphere may include at least 0.5% $F_2$, although a lower concentration may be effective in some embodiments. In particular the atmosphere may include at least 5% $F_2$ and more particularly at least 20% $F_2$. The atmosphere may additionally include nitrogen, helium, neon, argon, krypton, xenon, in any combination with the fluorine-containing oxidizing agent. In a particular embodiment, the atmosphere is composed of about 20% $F_2$ and about 80% nitrogen.

The manner of contacting the phosphor with the fluorine-containing oxidizing agent is not critical and may be accomplished in any way sufficient to achieve the desired properties. In some embodiments, a chamber containing the phosphor may be dosed and then sealed such that an overpressure develops as the chamber is heated, and in others, the fluorine and nitrogen mixture is flowed throughout the anneal process ensuring a more uniform pressure. In some embodiments, an additional dose of the fluorine-containing oxidizing agent may be introduced after a period of time.

In one embodiment, the $Mn^{4+}$ doped phosphor is further treated with a saturated solution of a composition of formula (II) in aqueous hydrofluoric acid after contacting the phosphor with the fluorine-containing oxidizing agent. The temperature at which the phosphor is contacted with the solution ranges from about 20° C. to about 50° C. The period of time required to treat the phosphor ranges from about one minute to about five hours, particularly from about five minutes to about one hour. Concentration of hydrofluoric acid in the aqueous HF solutions ranges from about 20% w/w to about 70% w/w, particularly about 40% w/w to about 70% w/w. Less concentrated solutions may result in lower yields of the phosphor.

$$A_x[MF_y] \tag{II}$$

where, A is Li, Na, K, Rb, Cs, or a combination thereof; M is Si, Ge, Sn, Ti, Zr, Al, Ga, In, Sc, Hf, Y, La, Nb, Ta, Bi, Gd, or a combination thereof; x is the absolute value of the charge of the [$MF_y$] ion; and y is 5, 6 or 7

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification.

For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The amount of manganese in the resulting $Mn^{4+}$ doped phosphor ranges from about 0.3 weight percent (wt %) to about 2.5 wt %, (from about 1.2 mole percent (mol %) to about 10 mol %), based on total weight of the precursor or phosphor. In some embodiments, the amount of manganese ranges from about 0.3 wt % to about 1.5 wt % (from about 1.2 mol % to about 6 mol %), particularly from about 0.50 wt % to about 0.85 wt % (from about 2 mol % to about 3.4 mol %), and more particularly from about 0.65 wt % to about 0.75 wt % (from about 2.6 mol % to about 3 mol %). In other embodiments, the amount of manganese ranges from about 0.75 wt %-2.5 wt % (about 3 mol % to about 10 mol %), particularly from about 0.9 wt % to 1.5 wt % (from about 3.5 mol % to about 6 mol %), more particularly from about 0.9 wt % to about 1.4 wt % (about 3.0 mol % to about 5.5 mol %), and even more particularly from about 0.9 wt % to about 1.3 wt % (about 3.5 mol % to about 5.1 mol %).

Some embodiments of the invention are directed to a lighting apparatus that include a phosphor material radiationally coupled to a light source. FIG. 1 illustrates a lighting apparatus or light emitting assembly or lamp 10 according to one embodiment of the present invention. Lighting apparatus 10 includes a semiconductor radiation source, shown as light emitting diode (LED) chip 12, and leads 14 electrically attached to the LED chip. The leads 14 may be thin wires supported by a thicker lead frame(s) 16 or the leads may be self-supported electrodes and the lead frame may be omitted. The leads 14 provide current to LED chip 12 and thus cause it to emit radiation.

The lamp may include any semiconductor blue or UV light source that is capable of producing white light when its emitted radiation is directed onto a phosphor material. In one embodiment, the semiconductor light source is a blue emitting LED doped with various impurities. Thus, the LED may comprise a semiconductor diode based on any suitable III-V, II-VI or IV-IV semiconductor layers and having an emission wavelength of about 250 to 550 nm. In particular, the LED may contain at least one semiconductor layer comprising GaN, ZnSe or SiC. For example, the LED may comprise a nitride compound semiconductor represented by the formula $In_iGa_jAl_kN$ (where $0 \leq i$; $0 \leq j$; $0 \leq k$ and $I+j+k=1$) having an emission wavelength greater than about 250 nm and less than about 550 nm. In particular embodiments, the chip is a near-UV or blue emitting LED having a peak emission wavelength from about 400 to about 500 nm. Such LED semiconductors are known in the art. The radiation source is described herein as an LED for convenience. However, as used herein, the term is meant to encompass all semiconductor radiation sources including, e.g., semiconductor laser diodes. Further, although the general discussion of the exemplary structures of the invention discussed herein is directed toward inorganic LED based light sources, it should be understood that the LED chip may be replaced by another radiation source unless otherwise noted and that any reference to semiconductor, semiconductor LED, or LED chip is merely representative of any appropriate radiation source, including, but not limited to, organic light emitting diodes.

In lighting apparatus 10, a phosphor material 22 is radiationally coupled to the LED chip 12. The phosphor material 22 includes the $Me^{4+}$ doped phosphor as described in above embodiments. Radiationally coupled means that the elements are associated with each other so radiation from one is transmitted to the other. The phosphor material 22 is deposited on the LED 12 by any appropriate method. For example, a water based suspension of the phosphor(s) can be formed, and applied as a phosphor layer to the LED surface. In one such method, a silicone slurry in which the phosphor particles are randomly suspended is placed around the LED. This method is merely exemplary of possible positions of phosphor material 22 and LED 12. Thus, phosphor material 22 may be coated over or directly on the light emitting surface of the LED chip 12 by coating and drying a phosphor suspension over the LED chip 12. In the case of a silicone-based suspension, the suspension is cured at an appropriate temperature. Both the shell 18 and the encapsulant 20 should be transparent to allow white light 24 to be transmitted through those elements.

In other embodiments, the phosphor material 22 is interspersed within the encapsulant material 20, instead of being formed directly on the LED chip 12. The phosphor material (in the form of a powder) may be interspersed within a single region of the encapsulant material 20 or throughout the entire volume of the encapsulant material. Blue light emitted by the LED chip 12 mixes with the light emitted by phosphor composition 22, and the mixed light appears as white light. If the phosphor material is to be interspersed within the material of encapsulant 20, then a phosphor powder may be added to a polymer or silicone precursor, and then the mixture may be cured to solidify the polymer or silicone material after or before loading the mixture on the LED chip 12. Examples of polymer precursors include thermoplastic or thermoset polymers or a resin, for example epoxy resin. Other known phosphor interspersion methods may also be used, such as transfer loading.

In some embodiments, the encapsulant material 20 have an index of refraction R, and, in addition to phosphor composition 22, contains a diluent material having less than about 5% absorbance and index of refraction of R±0.1. The diluent material has an index of refraction of ≤1.7, particularly ≤1.6, and more particularly ≤1.5. In particular embodiments, the diluent material is of formula (II): $A_x[MF_y]$, and has an index of refraction of about 1.4. Adding an optically inactive material to the phosphor/silicone mixture may produce a more gradual distribution of light flux through the phosphor/encapsulant mixture and can result in less damage to the phosphor. Suitable materials for the diluent include fluoride compounds such as LiF, $MgF_2$, $CaF_2$, $SrF_2$, $AlF_3$, $K_2NaAlF_6$, $KMgF_3$, $CaLiAlF_6$, $K_2LiAlF_6$, and $K_2SiF_6$, which have index of refraction ranging from about 1.38 ($AlF_3$ and $K_2NaAlF_6$) to about 1.43 ($CaF_2$), and polymers having index of refraction ranging from about 1.254 to about 1.7. Non-limiting examples of polymers suitable for use as a diluent include polycarbonates, polyesters, nylons, polyetherimides, polyetherketones, polymers derived from styrene, acrylate, methacrylate, vinyl, vinyl acetate, ethylene, propylene oxide, ethylene oxide monomers, or copolymers thereof, including halogenated and unhalogenated derivatives. These polymer powders can be directly incorporated into silicone encapsulants before silicone curing.

In yet another embodiment, the phosphor material 22 is coated onto a surface of the shell 18, instead of being formed over the LED chip 12. The phosphor material is preferably coated on the inside surface of the shell 18, although the phosphor may be coated on the outside surface of the shell, if desired. Phosphor material 22 may be coated on the entire surface of the shell or only a top portion of the surface of the shell. The UV/blue light emitted by the LED chip 12 mixes with the light emitted by phosphor material 22, and the mixed light appears as white light. Of course, the phosphor material may be located in any two or all three locations or in any other suitable location, such as separately from the shell or integrated into the LED.

Figure 2:
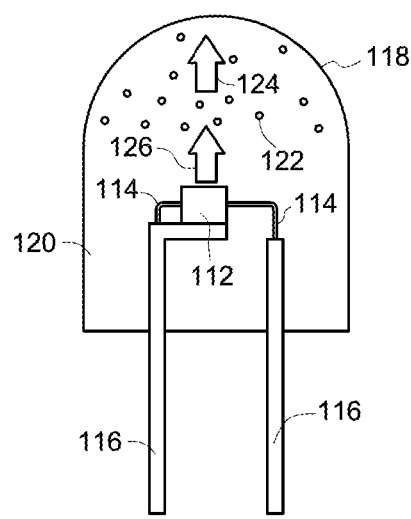
FIG. 2 is a schematic cross-sectional view of a lighting apparatus, in accordance with another embodiment of the invention.

FIG. 2 illustrates a second structure of the system according to the present invention. Corresponding numbers from FIGS. 1-4 (e.g. 12 in FIGS. 1 and 112 in FIG. 2) relate to corresponding structures in each of the figures, unless otherwise stated. The structure of the embodiment of FIG. 2 is similar to that of FIG. 1, except that the phosphor material 122 is interspersed within the encapsulant material 120, instead of being formed directly on the LED chip 112. The phosphor material (in the form of a powder) may be interspersed within a single region of the encapsulant material or throughout the entire volume of the encapsulant material. Radiation (indicated by arrow 126) emitted by the LED chip 112 mixes with the light emitted by the phosphor material 122, and the mixed light appears as white light 124. If the phosphor material is to be interspersed within the encapsulant material 120, then a phosphor powder may be added to a polymer precursor, and loaded around the LED chip 112. The polymer or silicone precursor may then be cured to solidify the polymer or silicone. Other known phosphor interspersion methods may also be used, such as transfer molding.

Figure 3:
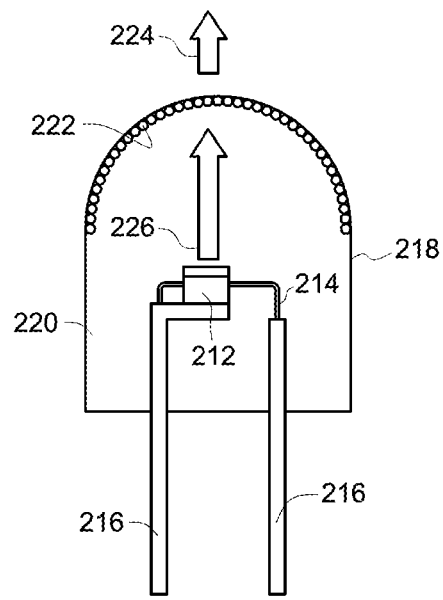
FIG. 3 is a schematic cross-sectional view of a lighting apparatus, in accordance with yet another embodiment of the invention.

FIG. 3 illustrates a third possible structure of the system according to the present invention. The structure of the embodiment shown in FIG. 3 is similar to that of FIG. 1, except that the phosphor material 222 is coated onto a surface of the envelope 218, instead of being formed over the LED chip 212. The phosphor material 222 is preferably coated on the inside surface of the envelope 218, although the phosphor may be coated on the outside surface of the envelope, if desired. The phosphor material 222 may be coated on the entire surface of the envelope, or only a top portion of the surface of the envelope. The radiation 226 emitted by the LED chip 212 mixes with the light emitted by the phosphor material 222, and the mixed light appears as white light 224. Of course, the structures of FIGS. 1-3 may be combined, and the phosphor material may be located in any two or all three locations, or in any other suitable location, such as separately from the envelope, or integrated into the LED.

In any of the above structures, the lamp may also include a plurality of scattering particles (not shown), which are embedded in the encapsulant material. The scattering particles may comprise, for example, alumina or titania. The scattering particles effectively scatter the directional light emitted from the LED chip, preferably with a negligible amount of absorption.

Figure 4:
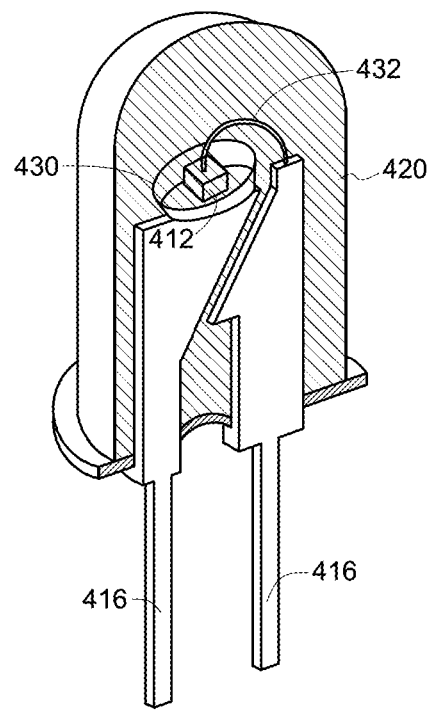
FIG. 4 is a cutaway side perspective view of a lighting apparatus, in accordance with one embodiment of the invention.

As shown in a fourth structure in FIG. 4, the LED chip 412 may be mounted in a reflective cup 430. The cup 430 may be made from or coated with a dielectric material, such as alumina, titania, or other dielectric powders known in the art, or be coated by a reflective metal, such as aluminum or silver. The remainder of the structure of the embodiment of FIG. 4 is the same as those of any of the previous figures, and can include two leads 416, a conducting wire 432, and an encapsulant material 420. The reflective cup 430 is supported by the first lead 416 and the conducting wire 432 is used to electrically connect the LED chip 412 with the second lead 416.

Figure 5:
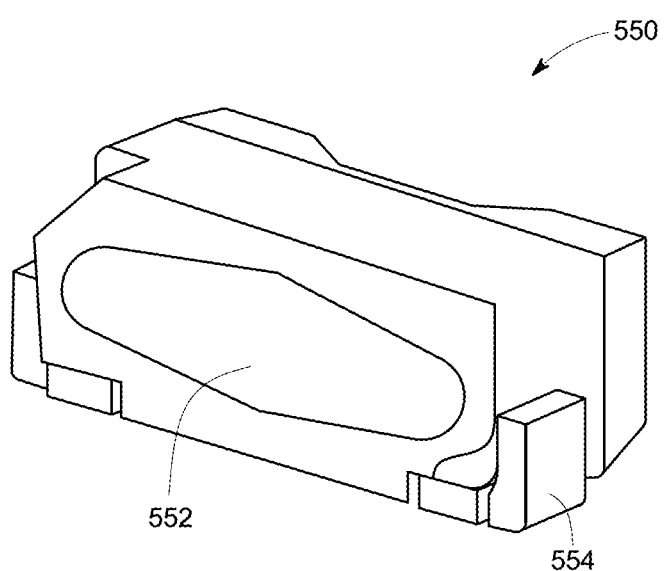
FIG. 5 is a schematic perspective view of a surface-mounted device (SMD) backlight LED, in accordance with one embodiment of the invention.

Another structure (particularly for backlight applications) is a surface mounted device ("SMD") type light emitting diode 550, e.g. as illustrated in FIG. 5. This SMD is a "side-emitting type" and has a light-emitting window 552 on a protruding portion of a light guiding member 554. An SMD package may comprise an LED chip as defined above, and a phosphor material that is excited by the light emitted from the LED chip. Other backlight devices include, but are not limited to, TVs, computers, monitors, smartphones, tablet computers and other handheld devices that have a display including a semiconductor light source; and a $Mn^{4+}$ doped phosphor according to the present invention.

When used with an LED emitting at from 250 to 550 nm and one or more other appropriate phosphors, the resulting lighting system will produce a light having a white color. Lamp 10 may also include scattering particles (not shown), which are embedded in the encapsulant material. The scattering particles may comprise, for example, alumina or titania. The scattering particles effectively scatter the directional light emitted from the LED chip, preferably with a negligible amount of absorption.

In addition to the $Mn^{4+}$ doped phosphor, the phosphor material 22 may include one or more additional phosphors. When used in a lighting apparatus in combination with a blue or near UV LED emitting radiation in the range of about 250 to 550 nm, the resultant light emitted by the assembly will be a white light. Additional phosphors such as green, blue, yellow, red, orange, or other color phosphors may be used in a blend to customize the white color of the resulting light and produce specific spectral power distributions.

Suitable additional phosphors for use in the phosphor material 22 include, but are not limited to: $((Sr_{1-z}(Ca, Ba, Mg, Zn)_z)_{1-(x+w)}(Li, Na, K, Rb)_w Ce_x)_3 (Al_{1-y}Si_y)O_{4+y+3(x-w)}F_{1-y-3(x-w)}$, $0<x\leq0.10$, $0\leq y\leq0.5$, $0\leq z\leq0.5$, $0\leq w\leq x$; $(Ca, Ce)_3Sc_2Si_3O_{12}(CaSiG)$; $(Sr,Ca,Ba)_3Al_{1-x}SixO_{4+x}F_{1-x}:Ce^{3+}$ (SASOF)); $(Ba,Sr,Ca)_5(PO_4)_3(Cl,F,Br,OH):Eu^{2+},Mn^{2+}$; $(Ba,Sr,Ca)BPO_5:Eu^{2+}, Mn^{2+}$; $(Sr,Ca)_{10}(PO_4)_6*vB_2O_3:Eu^{2+}$ (wherein $0<v\leq1$); $Sr_2Si_3O_8*2SrCl_2:Eu^{2+}$; $(Ca,Sr,Ba)_3MgSi_2O_8:Eu^{2+},Mn^{2+}$; $BaAl_8O_{13}:Eu^{2+}$; $2SrO*0.84P_2O_5*0.16B_2O_3:Eu^{2+}$; $(Ba,Sr,Ca)MgAl_{10}O_{17}:Eu^{2+},Mn^{2+}$; $(Ba,Sr,Ca)Al_2O_4:Eu^{2+}$; $(Y,Gd,Lu,Sc,La)BO_3:Ce^{3+},Tb^{3+}$; $ZnS:Cu^+,Cl^-$; $ZnS:Cu^+,Al^{3+}$; $ZnS:Ag^+,Cl^-$; $ZnS:Ag^+,Al^{3+}$; $(Ba,Sr,Ca)_2Si_{1-\delta}O_{4-2\delta}:Eu^{2+}$ (wherein $-0.2\leq\delta\leq0.2$); $(Ba,Sr,Ca)_2(Mg,Zn)Si_2O_7:Eu^{2+}$; $(Sr,Ca,Ba)(Al,Ga,In)_2S_4:Eu^{2+}$; $(Y,Gd,Tb,La,Sm,Pr,Lu)_3(Al,Ga)_{5-\alpha}O_{12-3/2\alpha}:Ce^{3+}$ (wherein $0\leq\alpha\leq0.5$); $(Ca,Sr)_8(Mg,Zn)(SiO_4)_4Cl_2:Eu^{2+},Mn^{2+}$; $Na_2Gd_2B_2O_7:Ce^{3+},Tb^{3+}$; $(Sr,Ca,Ba,Mg,Zn)_2P_2O_7:Eu^{2+},Mn^{2+}$; $(Gd,Y,Lu,La)_2O_3:Eu^{3+},Bi^{3+}$; $(Gd,Y,Lu,La)_2O_2S:Eu^{3+},Bi^{3+}$; $(Gd,Y,Lu,La)VO_4:Eu^{3+},Bi^{3+}$; $(Ca,Sr)S:Eu^{2+},Ce^{3+}$; $SrY_2S_4:Eu^{2+}$; $CaLa_2S_4:Ce^{3+}$; $(Ba,Sr,Ca)MgP_2O_7:Eu^{2+},Mn^{2+}$; $(Y,Lu)_2WO_6:Eu^{3+},Mo^{6+}$; $(Ba,Sr,Ca)_\beta Si_\gamma N_\mu:Eu^{2+}$ (wherein $2\beta+4\gamma=3\mu$); $(Ba,Sr,Ca)_2Si_{5-x}Al_xN_{8-x}O_x:Eu^{2+}$ (wherein $0\leq x\leq2$); $Ca_3(SiO_4)Cl_2:Eu^{2+}$; $(Lu,Sc,Y,Tb)_{2-u-v}Ce_vCa_{1+u}Li_wMg_{2-w}P_w(Si,Ge)_{3-w}O_{12-u/2}$ (where $0.5\leq u\leq1$, $0<v\leq0.1$, and $0\leq w\leq0.2$); $(Y,Lu,Gd)_{2-\varphi}Ca_\varphi Si_4N_{6+100}C_{1-\varphi}:Ce^{3+}$, (wherein $0\leq\varphi\leq0.5$); (Lu,Ca,Li,Mg,Y), α-SiAlON doped with $Eu^{2+}$ and/or $Ce^{3+}$; $(Ca,Sr,Ba)SiO_2N_2:Eu^{2+},Ce^{3+}$; β-SiAlON:$Eu^{2+}$, $3.5MgO*0.5MgF_2*GeO_2:Mn^{4+}$; $(Sr,Ca,Ba)AlSiN_3:Eu^{2+}$; $(Sr,Ca,Ba)_3SiO_5:Eu^{2+}$; $Ca_{1-c-f}Ce_cEu_fAl_{1+c}Si_{1-c}N_3$, (where $0\leq c\leq0.2$, $0\leq f\leq0.2$); $Ca_{1-h-r}Ce_hEu_rAl_{1-h}(Mg,Zn)_hSiN_3$, (where $0\leq h\leq0.2$, $0\leq r\leq0.2$); $Ca_{1-2s-t}Ce_s(Li,Na)_sEu_tAlSiN_3$, (where $0\leq s\leq0.2$, $0\leq f\leq0.2$, $s+t>0$); and $Ca_{1-o-\chi-\varphi}Ce_o(Li,Na)_\chi Et_\varphi Al_{1+o-\chi}Si_{1-o+\chi}N_3$, (where $0\leq\sigma\leq0.2$, $0\leq\chi\leq0.4$, $0\leq\varphi\leq0.2$).

Other materials suitable for use in phosphor material 22 include electroluminescent polymers such as polyfluorenes, preferably poly(9,9-dioctyl fluorene) and copolymers thereof, such as poly(9,9'-dioctylfluorene-co-bis-N,N'-(4-butylphenyl)diphenylamine) (F8-TFB); poly(vinylcarbazole) and polyphenylenevinylene and their derivatives. In addition, the light emitting layer may include a blue, yellow, orange, green or red phosphorescent dye or metal complex, or a combination thereof. Materials suitable for use as the phosphorescent dye include, but are not limited to, tris(1-phenylisoquinoline) iridium (III) (red dye), tris(2-phenylpyridine) iridium (green dye) and Iridium (III) bis(2-(4, 6-difluorephenyl)pyridinato-N,C2) (blue dye). Commercially available fluorescent and phosphorescent metal complexes from ADS (American Dyes Source, Inc.) may also be used. ADS green dyes include ADS060GE, ADS061GE, ADS063GE, and ADS066GE, ADS078GE, and ADS090GE. ADS blue dyes include ADS064BE, ADS065BE, and ADS070BE. ADS red dyes include ADS067RE, ADS068RE, ADS069RE, ADS075RE, ADS076RE, ADS067RE, and ADS077RE.

The ratio of each of the individual phosphors in the blend may vary depending on the characteristics of the desired light output. The relative proportions of individual phosphors in various phosphor blends may be adjusted such that when their emissions are blended and employed in an LED lighting device, there is produced visible light of predetermined x and y values on the CIE chromaticity diagram. As stated, a white light is preferably produced. This white light, for instance, may possess an x value in the range of about 0.20 to about 0.55, and a y value in the range of about 0.20 to about 0.55. As stated, however, the exact identity and amounts of each phosphor in the phosphor material can be varied according to the needs of the end user. For example, the material can be used for LEDs intended for liquid crystal display (LCD) backlighting. In this application, the LED color point would be appropriately tuned based upon the desired white, red, green, and blue colors after passing through an LCD/color filter combination. The list of potential phosphor for blending given here is not meant to be exhaustive and these $Mn^{4+}$ doped phosphors can be blended with various phosphors with different emission to achieve desired spectral power distributions.

The $Mn^{4+}$ doped phosphors of the present invention may be used in applications other than those described above. For example, the material may be used as a phosphor in a fluorescent lamp, in a cathode ray tube, in a plasma display device or in a liquid crystal display (LCD). The material may also be used as a scintillator in an electromagnetic calorimeter, in a gamma ray camera, in a computed tomography scanner or in a laser. These uses are merely exemplary and not limiting.

EXAMPLES

The example that follows is merely illustrative, and should not be construed to be any sort of limitation on the scope of the claimed invention.

Example 1

$MnF_2$ (0.082 grams) was mixed in 70 milliliters of about 48 percent HF solution in a platinum crucible. A platinum strip was immersed in the solution. With stirring, the solution was electrolyzed with a potential of about 3 volts and current of about 0.75 ampere until a red-brown solution was obtained. When the red-brown solution was formed, 7.5 milliliters $H_2SiF_6$ and 4.05 grams $KHF_2$ was added to the solution, and the electrolysis was continued at 3 volts and 0.75 ampere for about 2-3 hours. Pale yellow colored suspension was formed. This suspension was filtered followed by washing with acetone. The resulting powder product was finally dried in vacuum at about 100 degrees Celsius.

Figure 6:
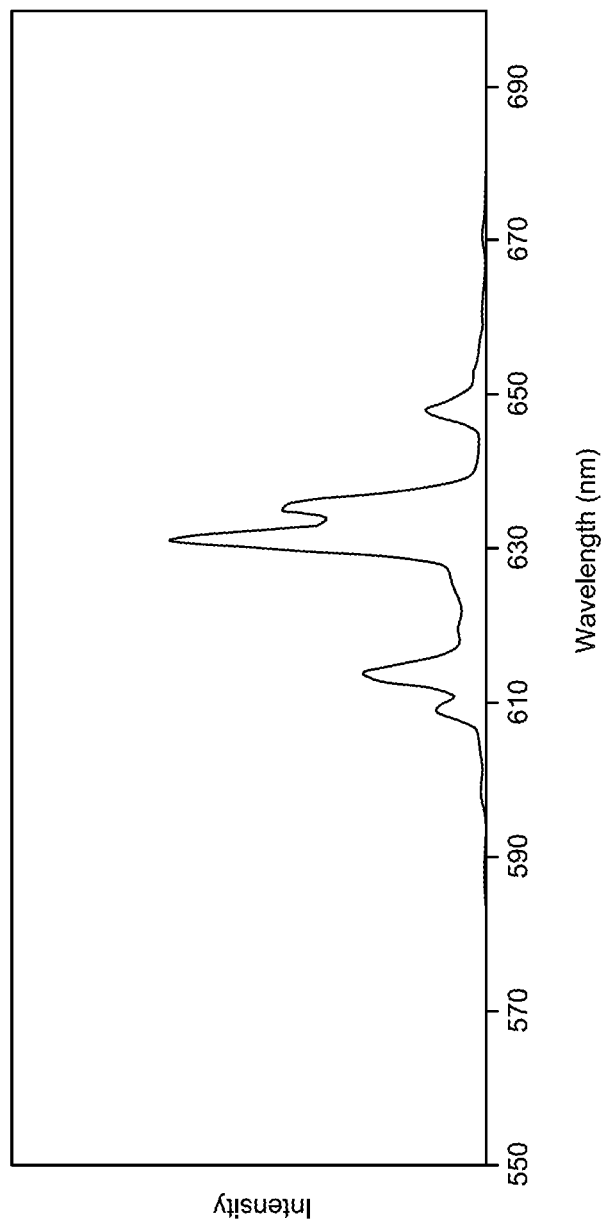
FIG. 6 is emission spectra of a phosphor composition synthesized by a process, in accordance with one embodiment of the invention.

The resulting powder was then characterized for analyzing its crystal structure by using powder x-ray diffraction. The powder was identified to have a crystalline structure similar to $K_2SiF_6$, confirming the formation of a complex fluoride. Further, the powder was characterized for measuring its emission spectrum by using a spectrophotometer. FIG. 6 shows emission spectrum of the resulting powder product. The powder product displayed red fluorescence when excited with UV or blue light, demonstrating the formation of a $Mn^{4+}$ doped complex fluoride i.e., a phosphor represented as $K_2SiF_6:Mn^{4+}$. The phosphor was measured for quantum efficiency at excitation wavelength 450 nm by using a quantum efficiency measuring system. The quantum efficiency of the phosphor was measured about 76.

The phosphor was then analyzed using particle size analyzer (Malvern). It was observed that the phosphor is composed mainly of particles having D10/D50/D90 particle size of about 2/6/20 microns.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A process for synthesizing a $Mn^{4+}$ doped phosphor of formula I:

$$A_x[MF_y]:Mn^{4+} \qquad (I)$$

wherein, A is Li, Na, K, Rb, Cs, or a combination thereof; M is Si, Ge, Sn, Ti, Zr, Al, Ga, In, Sc, Hf, Y, La, Nb, Ta, Bi, Gd, or a combination thereof;
x is the absolute value of the charge of the $[MF_y]$ ion; and y is 5, 6 or 7;
the method comprising electrolyzing a reaction solution comprising a source of manganese dissolved in at least one of hydrofluoric acid and hexafluorosilicic acid, a source of M and a source of A, wherein electrolyzing further comprises:
passing an electric current through the reaction solution comprising the source of manganese and at least one of hydrofluoric acid and hexafluorosilicic acid to form an electrolyzed manganese solution;
combining the source of M and the source of A with the electrolyzed manganese solution to form a combined solution; and
passing an electric current through the combined solution.

2. The process according to claim 1, wherein the source of manganese is a compound comprising $Mn^{2+}$, $Mn^{3+}$, $Mn^{4+}$, $Mn^{5+}$, $Mn^{6+}$ or a combination thereof.

3. The process according to claim 1, wherein the source of manganese is $MnF_2$, $MnF_3$, $MnCl_3$, $MnCl_2$, $MnO_2$ or a combination thereof.

4. The process according to claim 1, wherein M is Si, Ge, Ti, or a combination thereof.

5. The process according to claim 1, wherein the source of M is $H_2SiF_6$, $A_2SiF_6$, $SiO_2$, $SiCl_4$, $Si(OAc)_4$ or a combination thereof.

6. The process according to claim 1, wherein the source of A is AF, ACl, $AOCH_3$, $A_2C_2O_4$, $AH_2PO_4$, or a combination thereof.

7. The process according to claim 1, wherein the source of A is KF, $KHF_2$, or a combination thereof.

8. The process according to claim 1, wherein the $Mn^{4+}$ doped phosphor of formula I is $A_2[MF_6]:Mn^{4+}$, wherein A is Li, Na, K, Rb, Cs, or a combination thereof; and M is Si, Ge, Ti, or a combination thereof.

9. The process according to claim 1, wherein the $Mn^{4+}$ doped phosphor of formula I is $K_2SiF_6:Mn^{4+}$.

* * * * *